3,427,329
N¹-CYANO-5-NITRO-2-FURAMIDINE
Homer Albert Burch, Norwich, N.Y., assignor to The Norwich Pharmacal Company, a corporation of New York
No Drawing. Filed Dec. 5, 1966, Ser. No. 598,938
U.S. Cl. 260—347.7                    2 Claims
Int. Cl. C07d 5/30; A61k 27/00

ABSTRACT OF THE DISCLOSURE

Antibacterially active N¹-cyano-5-nitro-2-furamidine and a method for its preparation.

---

This invention relates to chemical compounds and more particularly to the chemical compound N¹-cyano-5-nitro-2-furamidine of the formula:

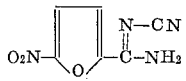

and to compositions containing it.

The compound of this invention is inimical in low concentrations to the growth of gram-negative and gram-positive organisms. Illustrative of such antibacterial propensity are the results set forth in the following table secured through the use of the commonly employed technique for ascertaining such behavior:

| Organism | Inhibiting concentration in mg., percent |
|---|---|
| S. aureus | 1.2 |
| E. coli | 0.3 |
| P. vulgaris | 5.0 |
| S. typhosa | 0.075 |
| S. pyogenes | 0.6 |
| S. agalactiae | 2.5 |
| E. insidiosa | 2.5 |
| A. aerogenes | 2.5 |

The antibacterial activity possessed by this compound makes it a valuable adjunct in compositions such as sprays, dusts, suspensions, solutions and the like designed to combat bacetrial contamination.

When admixed in poultry ration this compound finds application in veterinary medicine. Thus, when administered via the feed supply at a level of from 0.011–0.022% by weight thereof to chickens infected with *Salmonella gallinarum*, amelioration of such infection is obtained.

The method for preparing the compound of this invention consists in reacting ethyl 5-nitro-2-furimidate hydrochloride with cyanamide in the presence of an inert solvent such as methanol and a basic agent such as sodium methoxide.

In order that this invention may be readily available to and understood by those skilled in the art, the following preparation thereof is appended:

To a stirred solution of 32.1 g. (0.595) mole of sodium methylate in 1.5 l. of methanol is added 131 g. (0.595 mole) of ethyl 5-nitro-2-furimidate hydrochloride. The mixture is heated to reflux at which point a solution of 25.0 g. (0.595 mole) of cyanamide in 100 ml. of methanol is added in one portion. The mixture is refluxed for 3 hours, chilled and filtered (A). The residue is slurried in water, filtered, and dried at 60° to give 39.5 g. of product. The alcoholic filtrate (from A) is concentrated in vacuo to about 300 ml., cooled, and diluted to 3 l. with ether. An additional 39.7 g. of product separates. The total yield is 79.2 g. (74%). Recrystallization of 39 g. from 2 l. of acetonitrile, by reusing the filtrate several times, gives the product as colorless needles melting at 261–261.5° dec. (corr.) in a yield of 14 g. (36% recovery). Additional recrystallization gives a melting point of 259–260° dec. (corr.)

*Analysis.*—Calc'd. for $C_6H_4N_4O_3$: C, 40.1; H, 2.24; N, 31.11. Found: C, 40.08; H, 2.33; N, 31.28.

What is claimed is:
1. N¹-cyano-5-nitro-2-furamidine.
2. A method for preparing a chemical compound of claim 1 which comprises reacting ethyl 5-nitro-2-furimidate hydrochloride with cyanamide.

References Cited

FOREIGN PATENTS 1,213,850   9/1966   Germany.

ALEX MAZEL, *Primary Examiner.*

B. I. DENTZ, *Assistant Examiner.*

U.S. Cl. X.R.

424—285